United States Patent

Hotani et al.

Patent Number: 5,953,378
Date of Patent: Sep. 14, 1999

[54] FRAME SYNCHRONIZATION CIRCUIT AND COMMUNICATIONS SYSTEM

[75] Inventors: Sanae Hotani, Yokohama; Toshirou Kawahara, Yokosuka; Toshio Miki, Yokohama, all of Japan

[73] Assignee: NTT Mobile Communications Network Inc., Tokyo, Japan

[21] Appl. No.: 08/934,296

[22] Filed: Sep. 19, 1997

[30] Foreign Application Priority Data

Sep. 20, 1996 [JP] Japan ................... 8-250317

[51] Int. Cl.$^6$ ........................................ H03D 1/00
[52] U.S. Cl. ...................... 375/341; 375/368; 714/794
[58] Field of Search ............................. 375/341, 365, 375/368, 200, 260, 340, 346, 347, 349, 342, 366; 371/46, 44, 45, 43.6; 714/789, 794

[56] References Cited

U.S. PATENT DOCUMENTS

| | | | |
|---|---|---|---|
| 5,436,928 | 7/1995 | Fukuawa et al. ................. | 375/232 |
| 5,481,572 | 1/1996 | Sköld et al. ..................... | 375/347 |
| 5,559,757 | 9/1996 | Catipovic et al. ............... | 367/134 |
| 5,761,252 | 6/1998 | Iinuma ............................. | 375/347 |
| 5,790,588 | 8/1998 | Fukawa et al. .................. | 375/200 |

*Primary Examiner*—Don N. Vo
*Assistant Examiner*—Lenny Jiang
*Attorney, Agent, or Firm*—Brinks Hofer Gilson & Lione

[57] ABSTRACT

Likelihood calculating circuit A1 calculates the hamming distance between a received data series and a unique word as likelihood data d1. Likelihood calculating circuit A2 calculates the number of transmission errors using redundant data, and outputs this value as likelihood data d2. Likelihood data d1,d2 are added at adding circuit 21, and the output thereof is compared to the threshold value of determination circuit with threshold 22. The results of this comparison are output as determination signal with threshold DT. Synchronous determination circuit 23 generates a synchronous determination signal SD based on determination signal with threshold DT. Accordingly, the present invention provides a frame synchronization circuit in which it is possible to avoid out of synchronization or false synchronization, without increasing the amount of redundancy necessary to detect frame synchronization.

13 Claims, 11 Drawing Sheets

FRAME SYNCHRONIZATION CIRCUIT AND COMMUNICATIONS SYSTEM

TECHNICAL FIELD

The present invention relates to a frame synchronization circuit applied to data transmission with frame structure, and to a communications system employing this frame synchronization circuit, the frame synchronization circuit and communication systems described herein being particularly applicable in error-prone channels.

BACKGROUND ART

When sending information data, it is often the practice to attach redundant data in accordance with specific encoding rules in order to detect and correct transmission errors which have occurred on the transmission channels, or to compress the information data according to specific encoding rules in order to compress the amount of data being sent. The combination of information data and redundant data is referred to as a "frame." Each frame unit is then decoded at the receiving end. In order that the receiving end be able to detect the frames, a method has been widely employed in which a unique word which indicates the frame position is attached inside the frame. While the position of this unique word in the frame is not particularly restricted, it is most frequently disposed at the head of the frame in order to simplify the circuit structure. Thus, by detection of the unique word, the receiving end is able to identify the frame position and decode the transmitted information data.

FIG. 11 shows a block diagram of a conventional frame synchronization circuit. Data series D received via input terminal 11 is supplied to input buffer 15 which is inside unique word detection circuit 12, and is stored therein. Input buffer 15 generates data which is the length of the unique word by shifting each bit of received data series D sequentially, and supplies each generated data as one input to comparator 16. Unique word generator 17 supplies the correct unique word as another input to comparator 16. Comparator 16 then compares the generated data and the correct unique word, and outputs a "1" when they match or a "0" when they do not match to synchronous determination circuit 13.

For example, when the received data series D shown in FIG. 12(A) is received, the output of comparator 16 becomes as shown in FIG. 12(B). Please note that this example assumes that a transmission error did not occur on the transmission channels, and that there was not a bit pattern in the information data which by chance matched the bit pattern of the unique word.

The operation of synchronous determination circuit 13 will now be explained with reference given to FIG. 13. FIG. 13 is a state transition diagram for a conventional synchronous determination circuit. The first state is asynchronous state S1 in which the frames are not synchronized. In this explanation, an output of "1" from comparator 16 will be defined as "detected," indicating that a bit pattern which matches the unique word was detected in received data series D, and an output of "0" will be defined as "not detected," indicating that a bit pattern which matches the unique word was not detected in received data series D. When a bit pattern matching the unique word is detected, the operating state of synchronous determination circuit 13 transitions to backward 1 state S2. When a bit pattern matching the unique word is not detected, then the operating state of the circuit remains in asynchronous state S1, and awaits the next output from comparator 16.

After transitioning to backward 1 state S2, synchronous determination circuit 13 skips through received data series D by the fixed frame length, waits for the output from comparator 16, and determines whether a bit pattern matching the unique word is "detected" or "not detected". In the same manner as above, when a matching bit pattern is "detected", the operating state of the synchronous determination circuit transitions to backward 2 state S3, and again determines whether a matching bit pattern is "detected" or "not detected". This determination is then repeated in the same manner for the states subsequent to backward 2 state S3, with the operating state of synchronous determination circuit 13 arriving at synchronized state S5 once bit patterns matching the unique word are continuously detected.

In contrast, when a bit pattern matching the unique word is not detected between backward 1 state S2 and backward N state S4, the operating state of synchronous determination circuit 13 immediately returns to asynchronous state S1. This range of states from backward 1 state S2 to backward N state S4 is referred to as "backward protection", and is created to avoid false synchronization. Namely, if there is a bit pattern in received data series D which by chance matches the unique word (but is not the unique word), then this bit pattern will be incorrectly identified as the unique word, resulting in an false detection. This type of false detection can be avoided, however, by repeating the matching determination between the bit pattern and the unique word N times.

Even in synchronized state S5, synchronous determination circuit 13 continues to skip through received data series D by the fixed frame length, and determines whether a bit pattern matching the unique word is "detected" or "not detected". When a bit pattern matching the unique word is detected, the operating state of synchronous determination circuit 13 remains in the synchronized state, while when a matching bit pattern is not detected, the operating state of synchronous determination circuit 13 transitions to forward 1 state S6.

After transitioning to forward 1 state S6, synchronous determination circuit 13 continues to skip through received data series D by the fixed frame length, waits for the output from comparator 16, and then determines whether a matching bit pattern is "detected" or "not detected". When a matching bit pattern is not detected, the operating state of synchronous determination circuit 13 transitions to forward 2 state S7, and again determines whether a matching bit pattern is "detected" or "not detected". This determination is then repeated in the same way for states subsequent to forward 2 state S7. The operating state of synchronous determination circuit 13 arrives at asynchronous state S1 once there is continuous non-detection of a bit pattern matching the unique word.

On the other hand, when a bit pattern matching the unique word is detected between forward 1 state S6 to forward M state S8, the operating state of synchronous determination circuit 13 immediately returns to synchronized state S5. The range of states from forward 1 state S6 to forward M state S8 is referred to as "forward protection", and is provided to avoid out of synchronization. In other words, even when the unique word is not detected due to a transmission error, it is possible to avoid out of synchronization because the matching determination is repeated M times.

Variable length frame encoding is sometimes employed to compress the amount of date when encoding moving images. In this case, the length of the frame can be changed, so that even when a unique word has been detected and the frame position identified, it is not possible to predict the position of the next unique word. For this reason, it is not possible to employ a method such as the fixed frame length method above. Rather, it is necessary to go through each bit of received data series D sequentially, for all the frames, repeating the matching determination until a bit pattern matching the unique word is detected. Accordingly, it is not possible to employ synchronization protection such as shown in FIG. 13. In this case, then, false detection of a unique word has the most serious results. Namely, if a bit pattern which matches the unique word by chance is present in received date series D, this will be determined to be the correct position of the frame. As a result, meaningless data is extracted and decoded.

As a method to avoid this, an operation known as "stuffing" may be carried out in advance to the data series. This method checks the data to be transmitted, and inserts a predetermined dummy bit to the portion of the data which matches the unique word, so that false detection of the unique word is avoided. This method is widely employed in international standards for image encoding such as MPEG and the like. For example, if the unique word is "11111111", then for the parts of the data to be transmitted in which "1" is continuous for more than or equal to 8 bits, a 0 is inserted in the eighth bit as a dummy bit. As a result, the minimum hamming distance between the unique word and the transmitted data series can be set to be above or equal to 1, thereby avoiding false detection.

Further, a method has also been proposed in which much stronger frame synchronization can be obtained by applying encoding rules to the information data inside the frame (refer to Utility Model Application: Sho 57-64815). In this error detection/correction device, a method is employed together with the above-described unique word detection method in which the number of encoding violations in the received data series D is monitored. If the violation number is below a fixed threshold value, then a determination is made that the current position is the correct position for frame synchronization.

A unique word was employed as the synchronization code in the case of both the fixed length frame and the variable length frame methods described above. As a result, when a transmission error occurred on the transmission channels, the unique word was not detected or was incorrectly detected, leading to out of synchronization or false synchronization. On the other hand, when an attempt is made to improve this situation by increasing the length of the unique word, redundancy results because it is necessary to increase the hamming distance between the unique word and received data series D.

Further, when there is a high probability of false or miss detection, the technique of increasing the number of steps in forward protection (S2~S4) and backward protection (S6~S8) shown in the state transition diagram of FIG. 13 has been employed to avoid out of synchronization or false synchronization. However, this approach is disadvantageous in that a long time is required to establish synchronization, or to recover once false synchronization has occurred.

Moreover, in the case of variable length frames, when the above-described stuffing is carried out, it becomes necessary to attach dummy data. Accordingly, redundancy must be provided to the data being transmitted merely in order to establish frame synchronization. Moreover, in order to avoid miss detection due to transmission errors, a method may be considered in which a fixed number of non-matching of bits is permitted during the matching determination. However, in this case, the number of dummy bits introduced has to be increased to maintain a larger hamming distance, therefore further increasing redundancy.

The method disclosed in Utility Model Application Sho 57-64815 may also be considered, in which all of the information data to be transmitted is encoded using the same encoding rules. However, this method cannot be applied when only a portion of the information data is encoded, such as in the case of PDC, the well known high capacity digital signal transmission method (see ARIB RCR STD-S7C Chapter 5 Voice Coding System CODEC). Alternatively, if this method is employed, it results in a significant degradation in the ability to synchronize the frames.

Namely, it is typically the case that the non-encoded portion of the information data is a random series. When detection of encoding violations is performed on this portion of the data, false detection occurs frequently, in the same way as occurred in the case of detecting a unique word, so that it becomes difficult to know the correct position for frame synchronization. In particular, when this method is employed to wireless transmission channels, where transmission errors frequently occur, false detection can result with even greater frequency unless the detection threshold described above for avoiding miss detection is set carefully.

When a transmission error is present, it is generally the case that the unique word is more reliable than a supplementary signal obtained by encoding rule violations. For this reason, when the position for frame synchronization obtained using the unique word is supplemented by the frame synchronization position obtained using encoding rule violations, there is a concern that the reliability of frame synchronization will be impaired. On the other hand, to avoid this problem, Utility Model Application Sho 57-64815 discloses a detection method which extends over a plurality of frames. However, in this case, the time required to establish frame synchronization becomes longer. Accordingly, this method is disadvantageous in that it requires a long time to establish initial frame synchronization, and to recover once out of frame synchronization has occurred.

DISCLOSURE OF THE INVENTION

The present invention was conceived in consideration of the above-described circumstances, and has as its objective the provision of a frame synchronization circuit in which, even in the case of transmission channels where many transmission errors occur, there is no increase in the amount of redundancy required for frame synchronization, smaller probability of miss or false detection of the frame synchronizing timing which is the main cause of out of or false synchronization, and wherein the time required to establish synchronization or to recover when out of synchronization has occurred is short.

The basic concept behind the present invention evolved based on the following circumstances or characteristics. Namely:

1. In order to protect the data when sending it on transmission channels in which transmission errors occur frequently, it is a wide practice to apply an error detecting code or an error correcting code to the data, or to send the data multiple times. In order to reduce the amount of redundancy in this case, a plurality of error detecting and error correcting codes are often employed in which the degree of redundancy and the encoding rules differ in response to the information data's degree of sensitivity to transmission errors.

2. In the case of encoding rules for redundant data which are required in error detecting and correcting coding, or in multiple transmission, it is possible to carry out decoding without violating the encoding rules only when the data is extracted from the correct frame position. Further, in addition to errors in the position for frame synchronization, transmission errors on the transmission channels also cause encoding rule violations to occur.

3. Detection of encoding rule violations can be carried out using the hamming distance between unique words, or the likelihood of error correcting coding. The relationship between these values and the probability of a miss or false detection of the frame synchronization timing, i.e., the relationship between these values and the reliability of the frame synchronization timing, will vary depending on the encoding rules and the character of the transmission channels errors.

In order to resolve the above-described problems, in a frame synchronization circuit employed when receiving a data series in which $M(2 \leq M)$ encoding rules have been performed on some or all of the information data in a frame, there is provided N likelihood calculating means which calculate each of the likelihood corresponding to $N(2 \leq N \leq M)$ encoding rules from among the M encoding rules; N weighting means which multiply each coefficient with the output of the likelihood calculating means; an adding means which adds the outputs of each of the weighting means; and a determination means which compares the output of the adding means with a threshold value, and determines the position for frame synchronization based on the results of this comparison.

The likelihood calculating means is provided with a hamming distance calculating means for calculating the hamming distance between the received data series and the predetermined unique word indicating the frame position; and an error number calculating means for calculating the number of errors after error correcting and decoding have been performed on the portion of the received data series which was encoded according to Golay (23,12) error correcting encoding.

In order to resolve the aforementioned problems, in a frame synchronization circuit used to receive a data series in which attachment of a unique word indicating frame position is employed as one rule from among $M(2 \leq M)$ encoding rules which are performed to some or all of the information data in the frame, there is provided a detection means for detecting the hamming distance between the received data series and the unique word; a generating means which compares the predetermined threshold value with the hamming distance and generates a detection signal which becomes TRUE when the hamming distance is below the threshold value; N likelihood calculating means for calculating each of the likelihood corresponding to $N(2 \leq N \leq M)$ encoding rules from among M encoding rules, with respect to the received data series; N weighting means for multiplying each of the coefficients with the output of the likelihood calculating circuit; an adding means for adding the outputs of each of the weighting means; and a determination means for comparing the output of the adding means with the threshold value, and determining the position for frame synchronization based on the results of this comparison. Moreover, this frame synchronization circuit is characterized in that the likelihood calculating means, weighting means, adding means, and determination means operate at the timing at which the detection signal becomes TRUE.

In addition, the above-described frame synchronization circuit is also provided with a first control means for controlling at least one of either the coefficient of the weighting means or the threshold value of the determination means, in response to the state of the transmission channel associated with the received data series.

The above-described frame synchronization circuit is also provided with a synchronization state detection means for detecting the frame synchronization state, and a second control means for controlling at least one of either the threshold value of the determination means or the coefficient of the weighting means based on frame synchronization states in the past.

Furthermore, soft demodulation data which is a multilevel data may be employed as the received data series. In this case, the likelihood calculating means consists of a hamming distance calculating means for multilevel data.

In order to resolve the aforementioned problems, a communications system may be proposed which comprises a plurality of base stations connected by a network of communications circuits, and a communications terminal which communicates with any of the plurality of base stations by means of wireless communication, and which transmits and receives various data with another communications terminal that is connected to the network of communications circuits, or which transmits and receives various data with another communications terminal via another base station from among the aforementioned plurality of base stations; wherein the communications terminal is provided with a first receiving means for receiving and demodulating a signal from the base station; N first likelihood calculating means for calculating each of the likelihood corresponding to the N $(2 \leq N \leq M)$ encoding rules from among the M encoding rules, for the data series received and demodulated by the first receiving means; N first weighting means for multiplying each coefficient with the output of the first likelihood calculating circuit; a first adding means for adding each of the outputs of the first weighting means; a first determination means for comparing the output of the first adding means with the threshold value, and determining the position for frame synchronization based on the results of this comparison; and a first data processing means for extracting data from the received data series based on the results of the determination by the first determination means.

Further, the aforementioned base station is provided with a second receiving means for receiving and demodulating the signal from the communications terminal; N second likelihood calculating means for calculating each of the likelihood with respect to the N $(2 \leq N \leq M)$ encoding rules from among the M encoding rules, for the data series received and demodulated by the second receiving means; N second weighting means for multiplying each coefficient with the output of the second likelihood calculating circuit; a second adding means for adding each of the outputs of the second weighting means; a second determination means for comparing the output of the second adding means with the threshold value, and determining the position for frame synchronization based on the results of this comparison; and a second data processing means for extracting data from the received data series based on the results of the determination by the second determination means.

Accordingly, the present invention provides a frame synchronization circuit in which, even in the case of transmission channels in which transmission errors occur frequently, there is no increase in the redundancy required for frame synchronization, low probability of miss or false detection of the frame synchronization timing, which is the main cause of false synchronization or out of synchronization, and in which only a short time is required to establish synchronization or to recover once out of synchronization has occurred.

PREFERRED EMBODIMENTS OF THE PRESENT INVENTION

A. First Embodiment

In order to simplify the explanation, the minimum number of encoding rules applied in this embodiment will be two. The first encoding rule will be the attachment of a unique word as a synchronization code, and the second encoding rule will be the error correcting encoding for a portion of the information data. In this explanation, the length of the unique word is, for example, 32 bits, while Golay (23,12), a known binary complete code, will be employed as an example of an error correcting code. In the Golay code, the minimum distance is a binary (23,12) linear code of 7. In addition, please note that these types of codes are widely employed, and accordingly do not impair the generality of this explanation.

1: Structure of the First Embodiment

Figure 1:
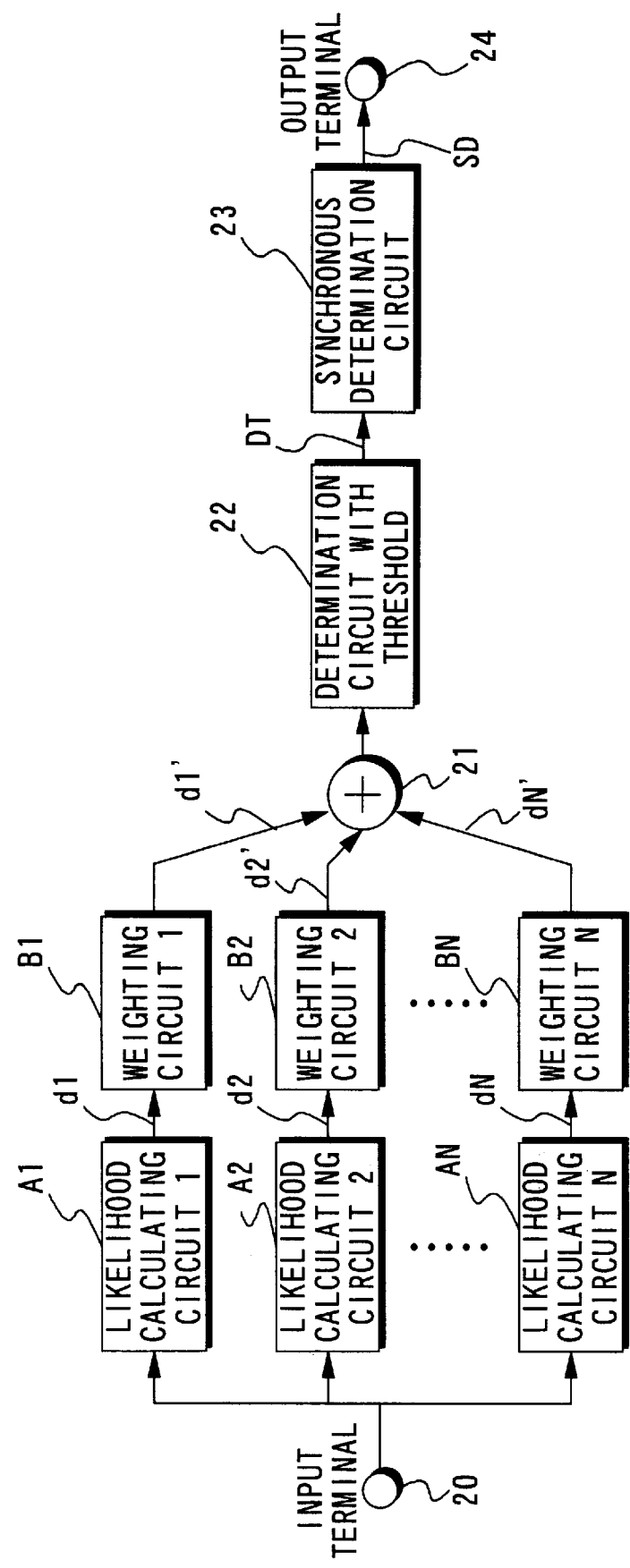
FIG. 1 is a block diagram of a frame synchronization circuit according to the first embodiment of the present invention.

The frame synchronization circuit according to the first embodiment of the present invention will now be explained with reference to the figures. FIG. 1 is a block diagram of a frame synchronization circuit according to the first embodiment. In this figure, A1, A2 ... AN are likelihood calculating circuits which are each connected to input terminal 20. These likelihood calculating circuits A1, A2 ... AN calculate the likelihood of the encoding rules. FIG. 1 shows N likelihood calculating circuits A1, A2 ... AN. However, it is sufficient that there are as many likelihood calculating circuits as there are encoding rules employed. Since first and second encoding rules are employed in this example, likelihood is calculated using two likelihood calculating circuits, A1 and A2.

Likelihood calculating circuit A1 corresponds to the first encoding rule, and holds a predetermined unique word. Likelihood calculating circuit A1 constantly compares the unique word and the inputted received data series D while shifting through the received data series one bit at a time, and outputs the hamming distance between the two as likelihood data d1. Meanwhile, likelihood calculating circuit A2 carries out error correcting decoding as it shifts one bit at a time through the portion of the inputted received data series D which was encoded using Golay (23,12) error correcting encoding, and outputs the obtained the number of errors as likelihood data d2.

B1, B2 ... BN are weighting circuits which are respectively connected to likelihood calculating circuits A1, A2, ... AN. Weighting circuits B1, B2 ... BN multiply weighting coefficients k1, k2 ... kN with likelihood data d1, d2, ... dN, and output weighted likelihood data d1', d2'... dN'. Weight coefficients k1, k2 ... kN are set after taking into consideration the encoding rules and the character of the transmission errors generated on the transmission channels, so that the position for frame synchronization can be accurately determined. As in the case of likelihood calculating circuits A1, A2, ... AN, it is sufficient to provide the same number of weighting circuits B1, B2 and BN as there are encoding rules employed. Accordingly, weighting circuits B1 and B2 are employed in this example.

The numeral 21 indicates an adder which adds the weighted likelihood data d1', d2' ... dN', and outputs the result. 22 is a determination circuit with threshold which compares the output data of adder 21 with the predetermined threshold value, and generates a determination signal DT which is "0" if the output data is above the threshold value, and "1" if the output data is below the threshold value. 23 is a synchronous determination circuit which determines whether synchronization has been established or not based on the threshold determination signal DT, and generates a synchronous determination signal SD which is "1" if synchronization has been established or "0" if synchronization has not been established. This synchronous determination signal SD is output to subsequent circuits (not shown) via output terminal 24. The simplest approach is to employ the determination signal DT as is, such that a determination signal of "1" indicates that synchronization has been established, and a determination signal of "0" indicates that synchronization has not been established.

2: Operation of the First Embodiment

The operation of the first embodiment will now be explained with reference to the figures. In this explanation, the unique word has been disposed to the $0^{th}$ word, $100^{th}$ word, $200^{th}$ word, and $300^{th}$ word in received data series D.

Figure 2:
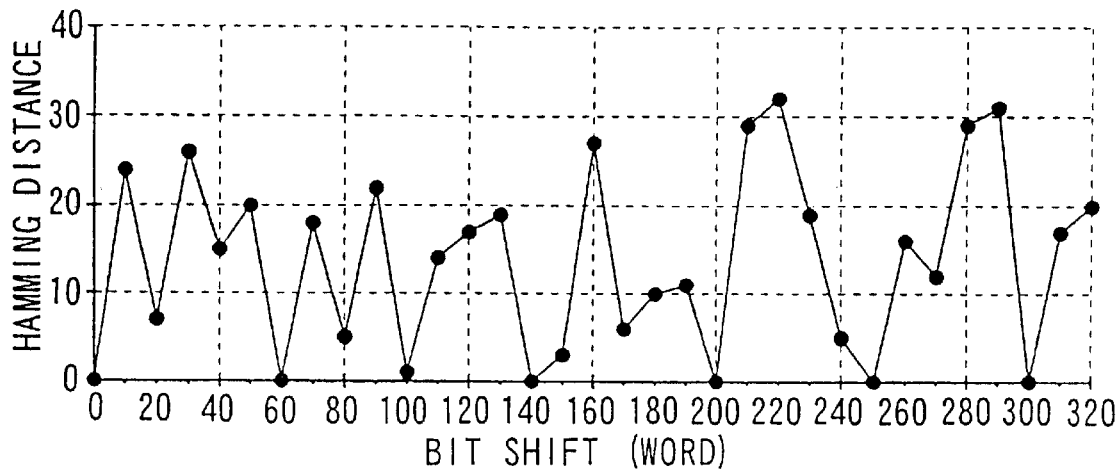
FIG. 2 shows the relationship between bit shift and the hamming distance calculated by likelihood calculating circuit A1 in the same embodiment.

Assuming that received data series D is received via transmission channels in which transmission errors are generated according to some specific probability, then the relationship between the hamming distance (likelihood) calculated at likelihood calculating circuit A1 and the bit shift is as shown in FIG. 2, for example. In this example, the hamming distance (the value indicated by likelihood data d1) is 0 or 1 at the correct frame position (i.e., the position of the $0^{th}$, $100^{th}$, $200^{th}$, or $300^{th}$ word). The reason that the hamming distance is 1 at the $100^{th}$ word is because a transmission error has occurred on the transmission channel. In contrast, for timings other than the $100^{th}$ word, the hamming distance may be understood to vary from 0~32. In general, information data other than the unique word may be frequently regarded as random. For this reason, it is possible that by chance the unique word and a hamming distance may be close to one another, or that a bit pattern may be completely identical to the unique word, at an incorrect frame position. In this example, the hamming distance is 2 at the 150$^{th}$ word, and is 0 at the 60$^{th}$, 140$^{th}$, and 250$^{th}$ words. Since it is difficult in this case to discriminate these hamming distances from the hamming distance obtained from the correct frame position, the frame synchronization position is determined based only on detection of the unique word. Accordingly, this leads to false synchronization.

Figure 3:
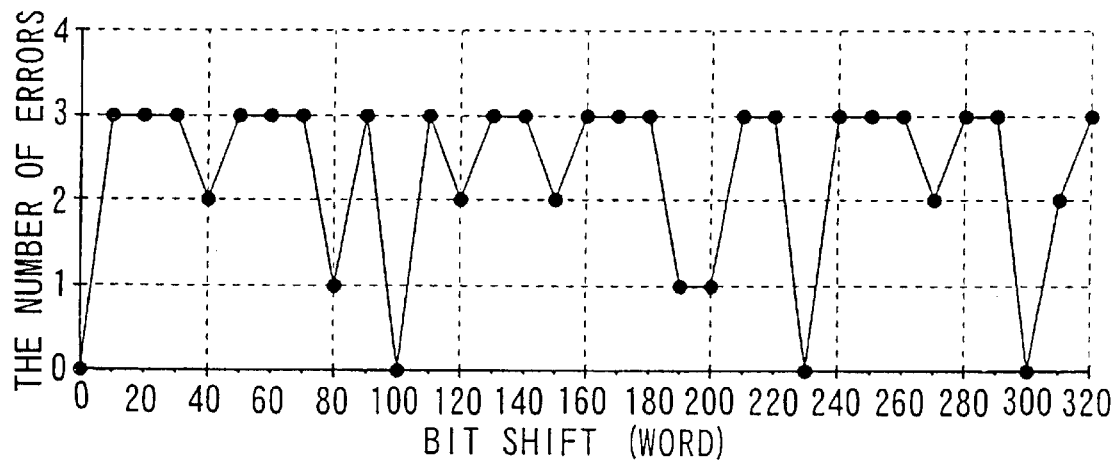
FIG. 3 shows the relationship between bit shift and the number of errors in the same embodiment.

Next, received data series D is supplied to likelihood calculating circuit A2, which decodes the received data series D and determines the number of errors (the value indicated by likelihood data d2). The relationship between the number of errors and the bit shift is, for example, as shown in FIG. 3. When likelihood has been calculated at the correct synchronization position, the number of errors is 0 or 1. The reason that the number of errors is "1" at the 200$^{th}$ word is that a one-bit transmission error has occurred in the information data. In contrast, it may be understood that the number of errors ranges from 0 to 3 at words other than the 200$^{th}$ word. In this example, the number of errors is 0 or 1 at the 80$^{th}$ word, 190$^{th}$ word, and 230$^{th}$ word. Since it is difficult to discriminate the number of errors in these cases from the number of errors obtained from the correct frame position, the position of frame synchronization is determined based only on the number of errors, resulting in false synchronization.

Accordingly, false synchronization occurs because a determination of the frame synchronization position was made based only on either the number of errors or the detection of the unique word, Therefore, in this embodiment, likelihood data d1, d2 is multiplied by weighting coefficients k1, k2 to obtain weighted likelihood data d1', d2' which are added at adder 21. A determination of the position for synchronization is then made based on this output data.

Figure 4:
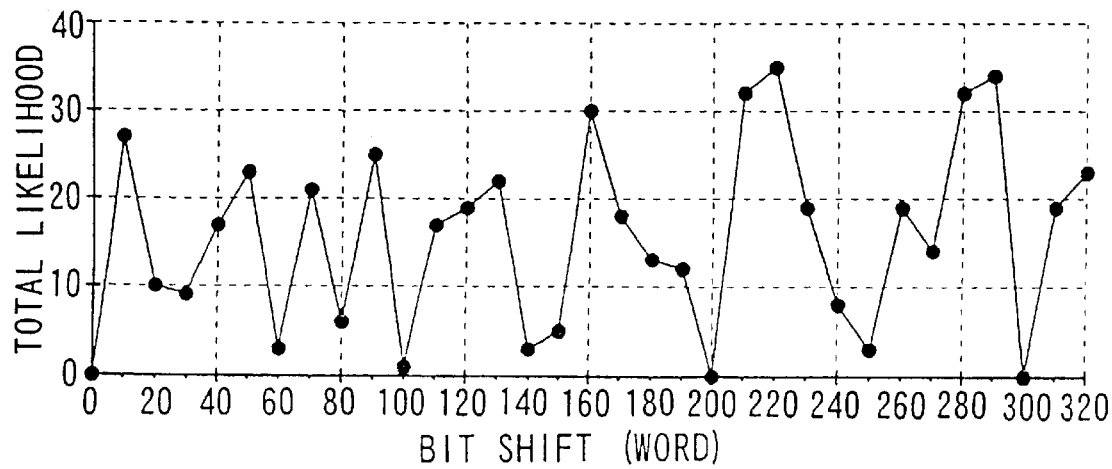
FIG. 4 shows the relationship between bit shift and the output data of adder 21 when the weighting coefficients k1, k2 are both set to "1" in the same embodiment.

Here, if the weighting coefficients k1, k2 are both set to 1, then the output data of adder 21 takes on the values shown in FIG. 4. In this case, at the correct frame synchronization position, the output data is 0 at the 0$^{th}$ word, 1 at the 100$^{th}$ word, 0 at the 200$^{th}$ word, and 0 at the 300$^{th}$ word. In contrast, the output data becomes 3 at each of the positions of the 60$^{th}$, 140$^{th}$ and 250$^{th}$ words, in which detecting unique word only leads to false detection. Further, output data become 6, 13 and 18 at each of the positions of 80$^{th}$, 190$^{th}$, and 230$^{th}$ words respectively, where detecting the number of errors only leads to false detection. Accordingly, if the threshold value of determination circuit with threshold 22 is "2", for example, then it is possible to establish synchronization at the correct position for frame synchronization. In all other cases, asynchronization results.

In this embodiment, then, likelihood corresponding to a plurality of types of encoding rules is calculated at likelihood calculating circuits A1~AN. These are then weighted, and a determination of the position for frame synchronization is made based thereon. As a result, even when a error-prone transmission channel is employed, the length of the unique word can be shortened. Further, the time required to establish synchronization, as well as the time required to recover once out of synchronization has occurred, is reduced.

B. Second Embodiment

This embodiment is equivalent to the first embodiment with the exception of weighting coefficients k1, k2 ... kN which switch in response to the state of the transmission channel. Additionally, in this example, the frame synchronization circuit is applied in mobile communications such as used by a cellular telephone or the like.

Figure 5:
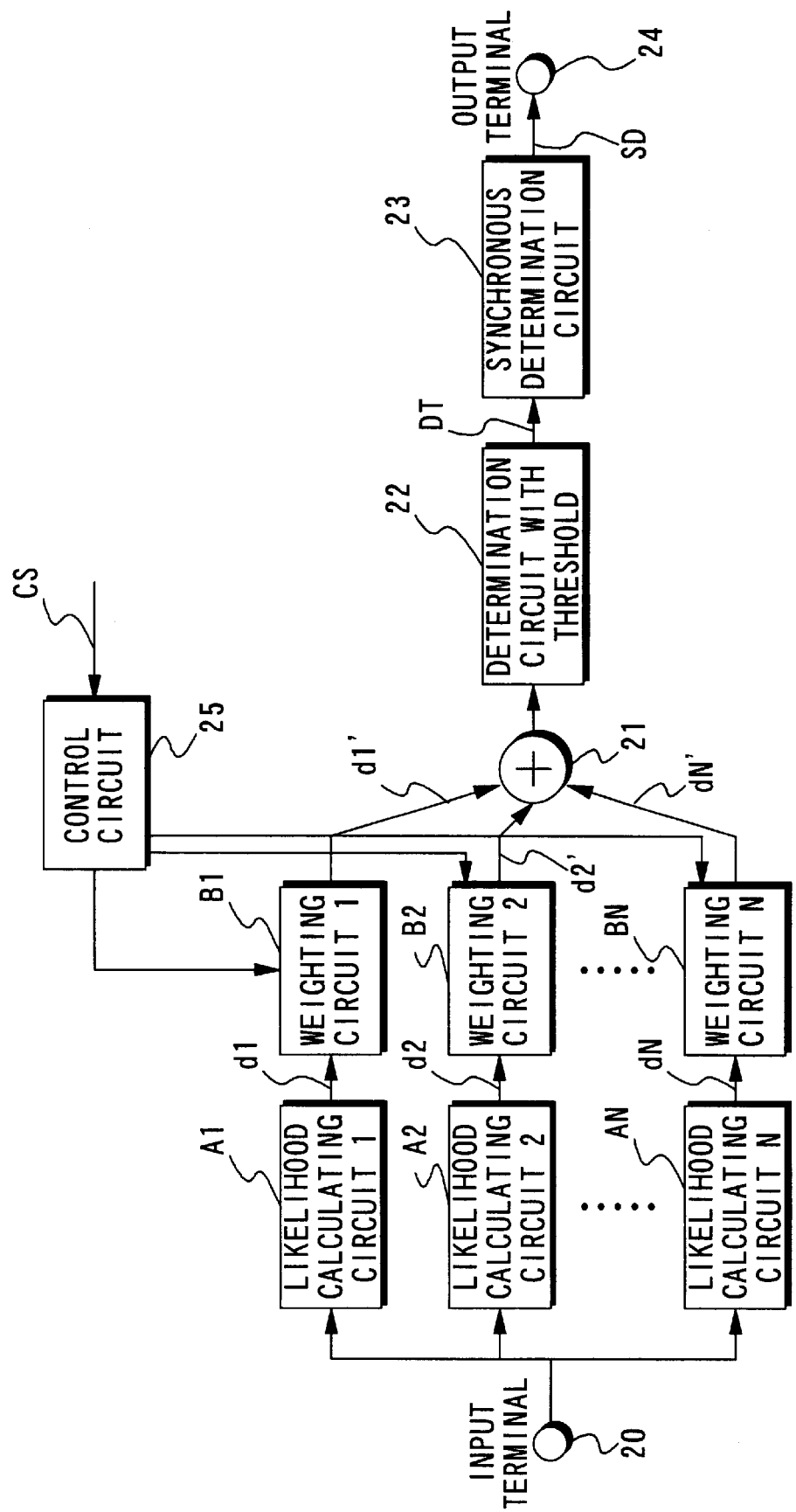
FIG. 5 is a block diagram of a frame synchronization circuit according to the second embodiment.

FIG. 5 is a block diagram of a frame synchronization circuit according to the second embodiment. In this figure, CS is channel information indicating the state of the transmission channel. Channel information CS shows the fading pitch and the received electric field strength of the radio channel. Fading (i.e., fluctuation in the received electric field strength) is generated when the mobile station moves at a high speed. In this case, when the received electric field strength falls below a fixed level, a burst error occurs. On the other hand, channel errors when the mobile station is stopped are often random errors. Accordingly, it is possible to know the character of the errors generated on the transmission channel by referring to the fading pitch of the channel information CS.

A controller 25 is shown in FIG. 5. Controller 25 generates a control signal for controlling weighting coefficient k1, k2 ... kN based on channel information CS, and outputs this control signal to weighting circuit B1, B2, ... ,BN.

However, the respective reliability of likelihood data d1, d2, ... dN supplied by likelihood calculating circuits A1, A2, ... ,AN differs depending on the state of the transmission channel. This point will now be explained in detail. Here, as in Embodiment 1, likelihood calculating circuit A1 detects the hamming distance between received data series D and the unique word as likelihood data d1. Likelihood calculating circuit A2 detects the number of errors as likelihood data d2.

If the mobile station is moving at a high speed, the channel error generated in the transmission channel is frequently a burst error such as described above. In this case, if a channel error occurs at the correct position for frame synchronization, then continuous error occurs on the unique word for frame synchronization. As a result, the hamming distance between the received data series D and the unique word becomes larger. On the other hand, when the mobile station is stopped, channel errors occurring in the transmission channel may be viewed as random errors. Accordingly, even if an error occurs at the correct frame synchronization position, the probability that a plurality of channel errors will occur in the unique word is low. For this reason, the hamming distance between received data series D and the unique word is small. Accordingly, if the transmission channel is in a state in which a burst error readily occurs, the reliability of likelihood data d1 is low, while if the transmission channel is in a state in which a random error occurs readily, the reliability of likelihood data d1 is high.

The change in likelihood data d2 accompanying the change in the state of the transmission channel differs according to the encoding method for received data series D. For example, when a code which is resistant to burst errors, such as a FAIA code, is employed as the encoding method, accurate detection is still possible even if a burst error occurs. In this case, the reliability of likelihood data d2 is high regardless of the state of the transmission channel. Accordingly, the reliability of likelihood data d1 and likelihood data d2 varies mutually, in accordance with the change in the state of the transmission channel.

The reliability of likelihood data d1, d2, ... ,dN obtained from likelihood calculating circuits A1, A2 ... AN changes individually and mutually according to the state of the transmission channel. This embodiment focuses on this point. Namely, in this embodiment, the reliability of likelihood data d1, d2, ... ,dN is calculated based on channel information CS, with the weighting coefficient k1, k2, ... ,kN being varied in response to the calculated reliability. In the preceding example, when a determination is made from the channel information CS that the state of the transmission channel is one in which burst errors readily occur, then weighting coefficient k1 is made smaller, and the relative contribution from likelihood data d1 is reduced. On the other hand, when a determination is made from channel information CS that the state of the transmission channel is one in which random errors occur readily, then the weighting coefficient k1 is set to a regular value. As a result, it is possible to suitably control the weighting coefficients k1, k2 ... kN, so that even if the state of the transmission channel changes, the position for frame synchronization can be accurately detected.

C. Third Embodiment

This embodiment is equivalent to the first embodiment, with the exception that the threshold value of the determination circuit with threshold is controlled based on past results for synchronous determination. In this embodiment, variable length encoding is performed on the information data, with helper data indicating the frame length disposed to the header of the received data series D.

Figure 6:
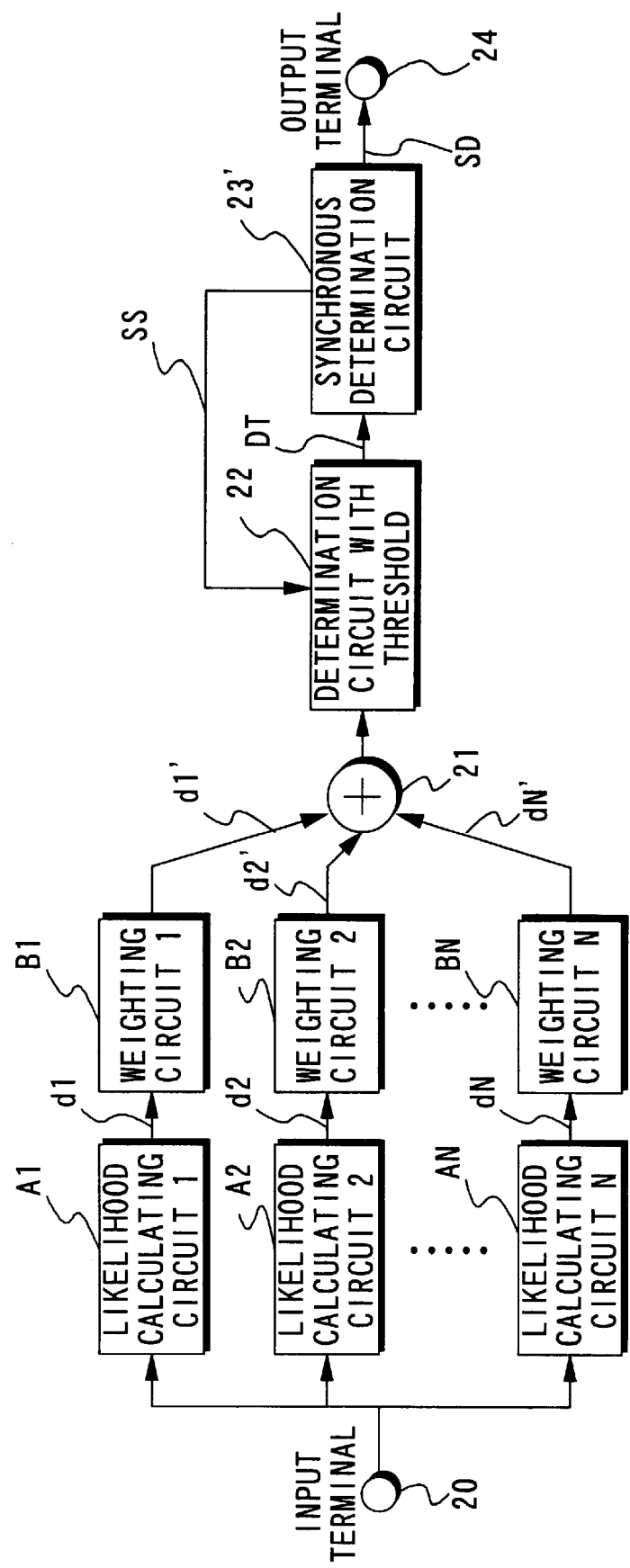
FIG. 6 is a block diagram of a frame synchronization circuit according to the third embodiment.

FIG. 6 is a block diagram of a frame synchronization circuit according to the third embodiment of the present invention. Synchronous determination circuit 23' generates threshold control signal SS based on determination signal with threshold DT and received data series D supplied via input terminal 20. Threshold control signal SS indicates the threshold value, and is fed back to determination circuit with threshold 22, causing the threshold value to be changed.

Figure 7:
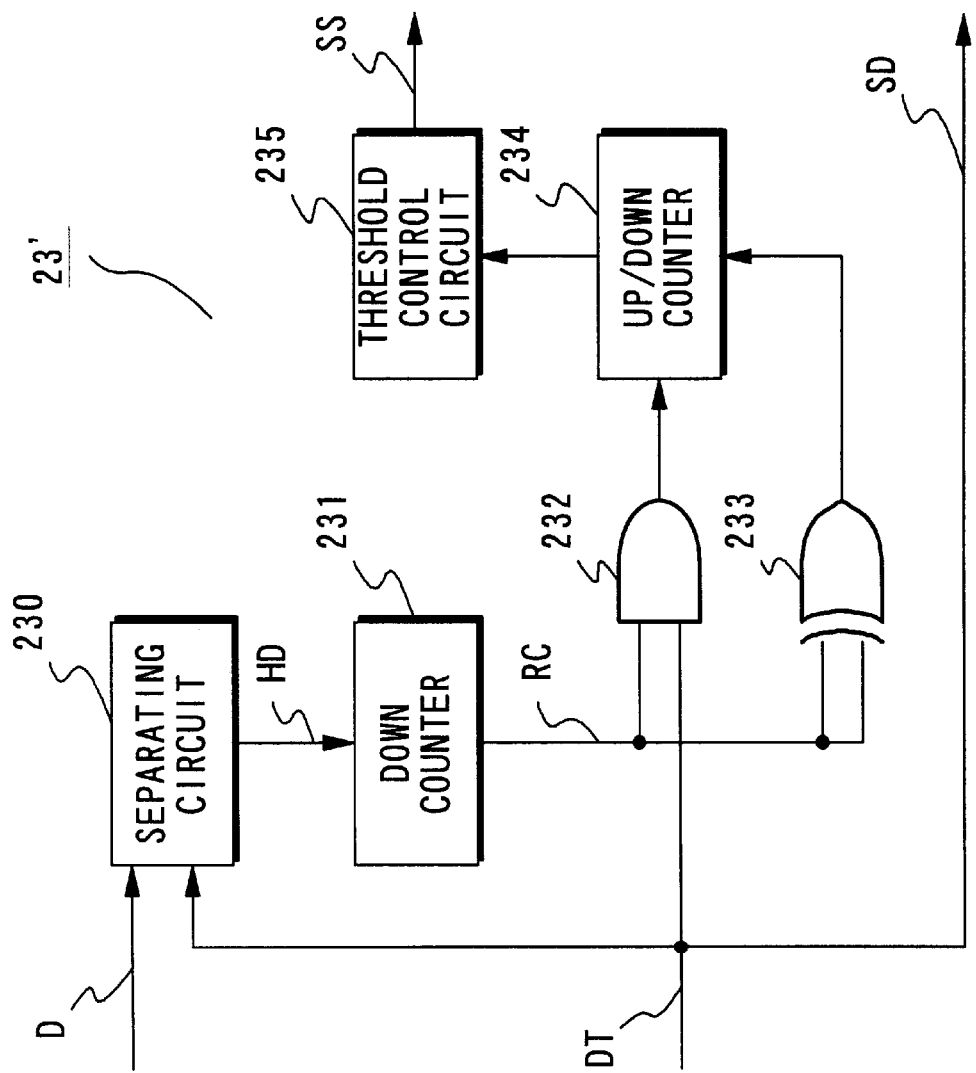
FIG. 7 is a circuit diagram of synchronous determination circuit 23' according to the third embodiment.

A circuit diagram for synchronous determination circuit 23' is shown in FIG. 7. Received data series D and determination signal with threshold DT are supplied to separating circuit 230, which separates out helper data HD from the received data series D based on the frame synchronization position ("1") indicated by determination signal with threshold DT. This helper data HD is then supplied to down counter 231. After loading helper data HD, down counter 231 begins a countdown using a clock signal which is regenerated from the received data series. Once the counted value reaches "0", down counter 231 generates a ripple carry signal RC which becomes "1" in this case and "0" in all other cases.

Since helper data HD indicates the length of the frame, the timing at which ripple carry signal RC becomes "1" is the timing at which detection of the next unique word is predicted. If the current frame synchronization position has been correctly detected, and the next frame synchronization position has been correctly detected, then, provided that an transmission error does not occur in the helper data HD, the timings at which the ripple carry signal RC and the determination signal with threshold DT become "1" are equivalent. On the other hand, if false synchronization occurs in either of these, then the timing at which the ripple carry signal RC becomes "1" and the timing at which the determination signal with threshold DT becomes "1" will not coincide. AND circuit 232 detects the former case, and outputs a "1" when detection of the frame synchronization position is continuous and correct. EX-OR circuit 233 detects the latter case, and outputs a "1" when false synchronization occurs. The output of AND circuit 232 is supplied to the up-counter terminal and the output of EX-OR circuit 233 is supplied to the down-counter terminal of up/down counter 234.

In this case, when continuous and correct frame synchronization positions are detected, the counter value of up/down counter 234 is increased, while when false synchronization occurs, the counter value is decreased. Accordingly, the counter value of up/down counter 234 at a given time indicates the degree to which the past synchronization results were TRUE. Threshold control circuit 235 generates a threshold control signal SS based on the counter value, with the threshold value being controlled based on this signal.

However, when the received data series D is supplied to the frame synchronization circuit via transmission channels on which burst errors readily occur, it is assumed that once synchronization has been correctly established at a portion of the data in which there is no transmission error, it is easy to subsequently detect the correct synchronization position for data in which there are few transmission errors. In this case, if the threshold value of determination circuit with threshold 22 can be set to a low value, then false synchronization can be reduced. On the other hand, when received data series D ingresses via a transmission channels on which transmission errors readily occur, then continuous asynchronization readily occurs. Accordingly, in the case where a state of asynchronization continues, then it may be assumed that asynchronization occurs readily thereafter. In this type of situation, it is possible to avoid asynchronization if the threshold value of threshold determination circuit 22 is set to a high value.

In this example, the threshold value of determination circuit with threshold 22 is controlled in response to the counter value of up/down counter 234 which indicates past synchronization results. More specifically, control is carried out by setting the threshold value to be low when the counter value is large, and setting the threshold value to be high when the counter value is small. As a result, the threshold value is adaptively controlled, making it possible to avoid asynchronization or false synchronization.

D. Fourth Embodiment

The fourth embodiment is equivalent to the first embodiment, with the exception of the provision of a unique word detection circuit 30 and a first determination circuit with threshold 31.

Figure 8:
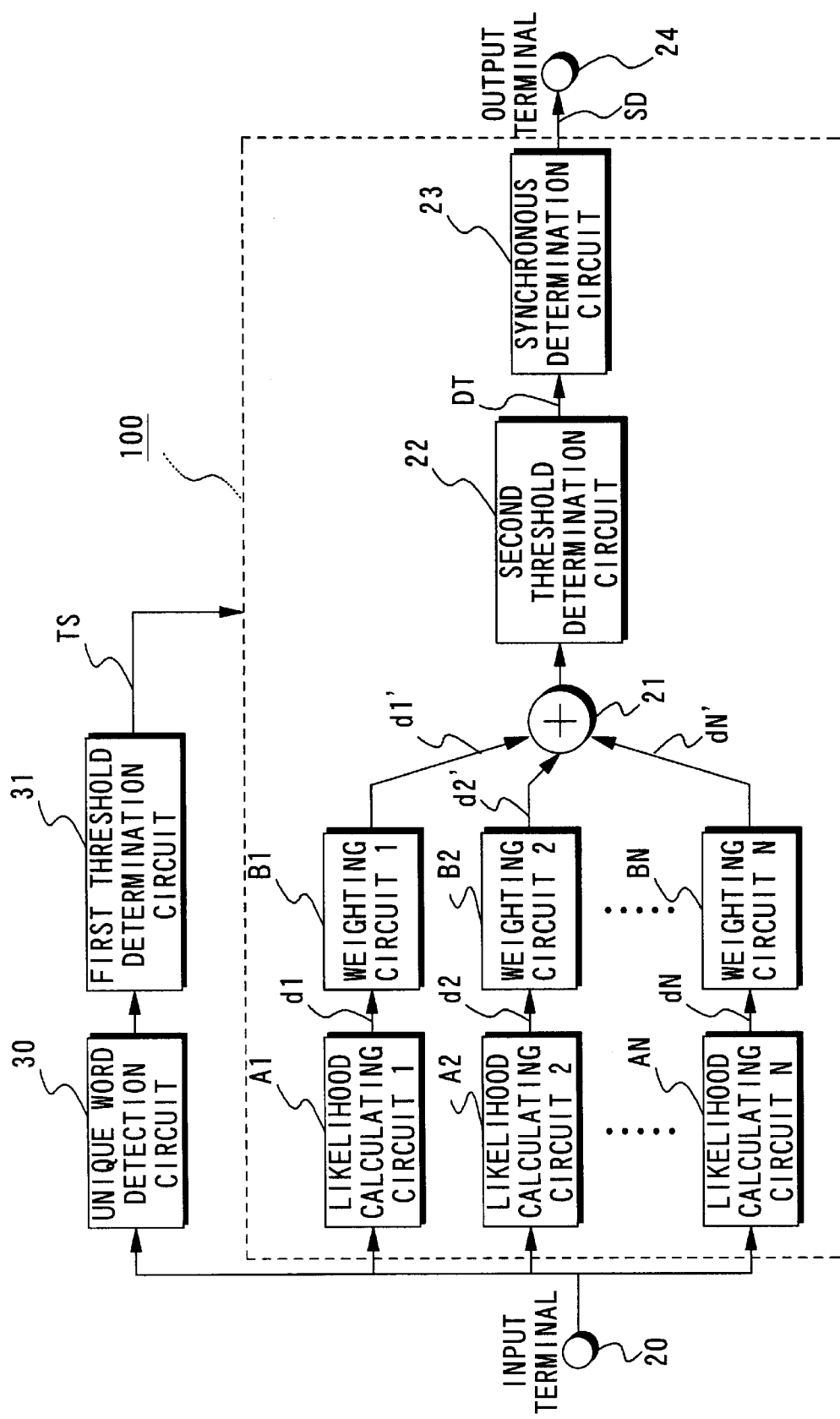
FIG. 8 is a block diagram of a frame synchronization circuit according to the fourth embodiment.

FIG. 8 is a block diagram of a frame synchronization circuit according to the fourth embodiment. In this figure, unique word detection circuit 30 calculates the hamming distance between the received data series and the unique word, and outputs this value to first determination circuit with threshold 31. First determination circuit with threshold 31 generates a trigger signal TS which is "1" when the hamming distance is below the first threshold value, and "0" in all other cases. This first threshold value is set to avoid miss detection from overlooking the synchronization position, and so that the amount of calculations can be reduced. Accordingly, while there is a possibility of false detection of the synchronization position in the case of a timing at which the trigger signal becomes "1", a miss detection does not occur.

Figure 9:
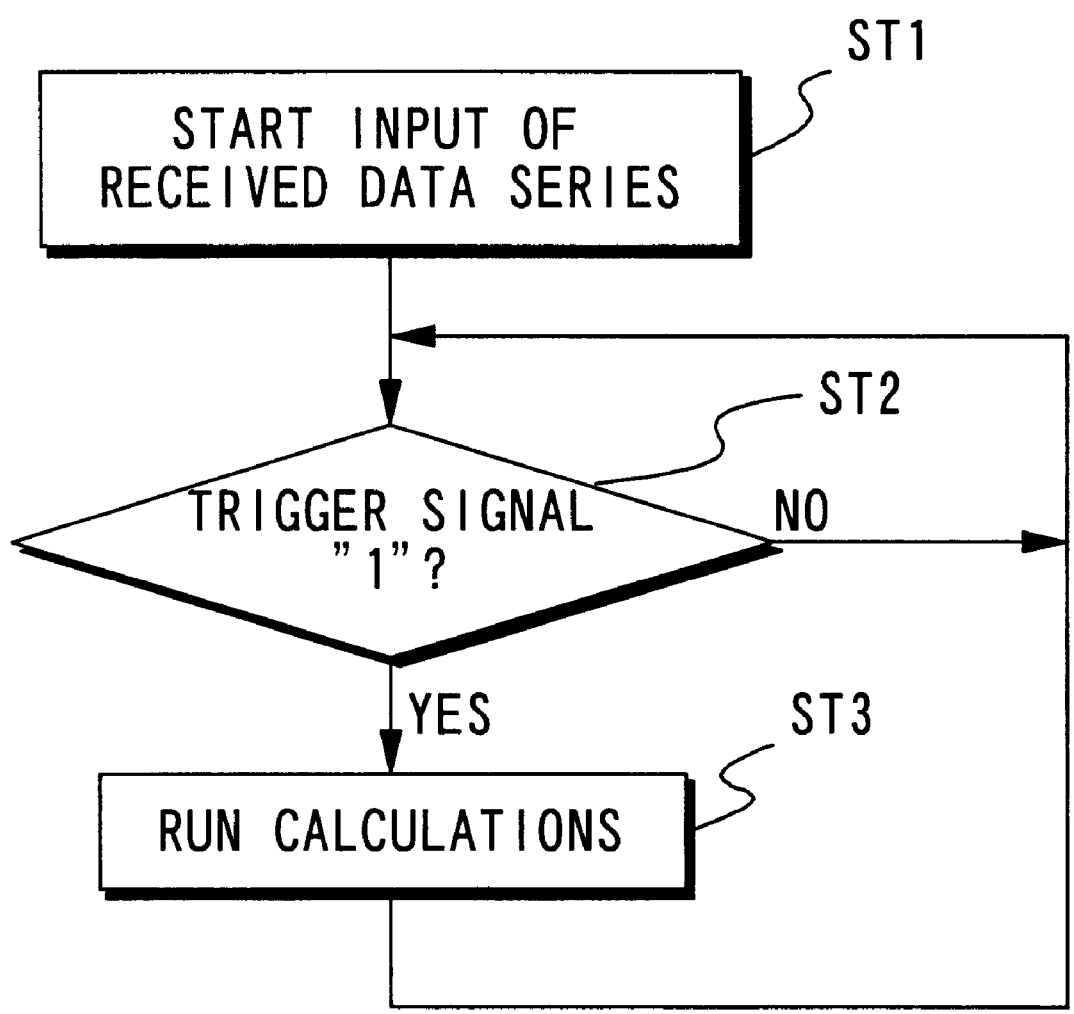
FIG. 9 is a flow chart showing the operation of the frame synchronization circuit according to the fourth embodiment.

Trigger signal TS is employed as a trigger for circuit 100 (i.e., the frame synchronization circuit of the first embodiment) which is enclosed by the dashed line in FIG. 8. This point will now be explained with reference given to FIG. 9. FIG. 9 is a flow chart showing the operation of the frame synchronization circuit. In this figure, when the input of received data series D begins (step ST1), a determination is made as to whether or not trigger signal TS is "1" (step ST2). If the trigger signal TS is "0", the determination is repeated until trigger signal TS becomes "1". Once trigger signal TS is "1", processing precedes to step ST3, where calculations are carried out by circuit 100. The processing then returns to step ST2, and the processing at steps ST2 and ST3 are then repeatedly carried out. In other words, a first stage determination of synchronization is carried out by unique word detection circuit 30 and first determination circuit with threshold 31, while a second stage determination is carried out by circuit 100. Since the frame synchronization position is inferred by means of this first stage determination of synchronization, the amount of calculations which must be performed by circuit 100 can be reduced. Then, in the second stage determination of synchronization, the identification of the frame synchronization position is correctly carried out.

As a result, in this embodiment, calculations by circuit 100 are performed only in the case where the trigger signal TS is "1". Therefore, it is possible to correctly identify the frame synchronization position, while reducing the amount of calculations. In particular, when calculating the number of errors as a likelihood at the likelihood calculation circuit, it is ordinarily necessary to obtain the surplus in the Galois field. Moreover, since it is necessary to calculate the surplus while sequentially shifting through the frame synchronization position one bit at a time, it is possible to significantly reduce the amount of calculations.

E. Modifications

The present invention is not limited to the preceding embodiments, but may be modified in the following ways, for example.

1. In each of the preceding embodiments, convolution encoding may have been performed on the received data series. In this case, the likelihood at the time of Viterbi decoding may be calculated at one of likelihood calculating circuits A1~AN. In addition, it is also acceptable to determine likelihood at likelihood calculating circuits A1~AN based on detection of unique words of different lengths, CRC error detection, Huffman encoding rule violations, stuffing error detection or the like.

2. In the preceding embodiments, it is not essential that the number of encoding rules associated with the received data series and the number of likelihood calculating circuits A1~AN coincide. Specifically, if there are M encoding rules, then it is acceptable to provide N likelihood calculating circuits which calculate each of the likelihoods corresponding to N encoding rules from the M encoding rules ($2 \leq N \leq M$).

3. The second and third embodiments may be combined. In the second embodiment, weighting coefficients k1~kN are controlled based on channel information CS, however, it is also acceptable to control the threshold value of determination circuit with threshold 22 based on this information. In the third embodiment, the threshold value was controlled based on the threshold control signal SS, however it is also acceptable to control weighting coefficient k1~kN using this signal. In addition, these modifications may be suitably combined with the second through fourth embodiments.

4. Furthermore, the received data series may be the soft demodulation data which is a multilevel data. In this case, the likelihood may be obtained based on the soft demodulation value, or the hamming distance calculation by using values obtained by soft value.

F. Examples of Application

Figure 10:
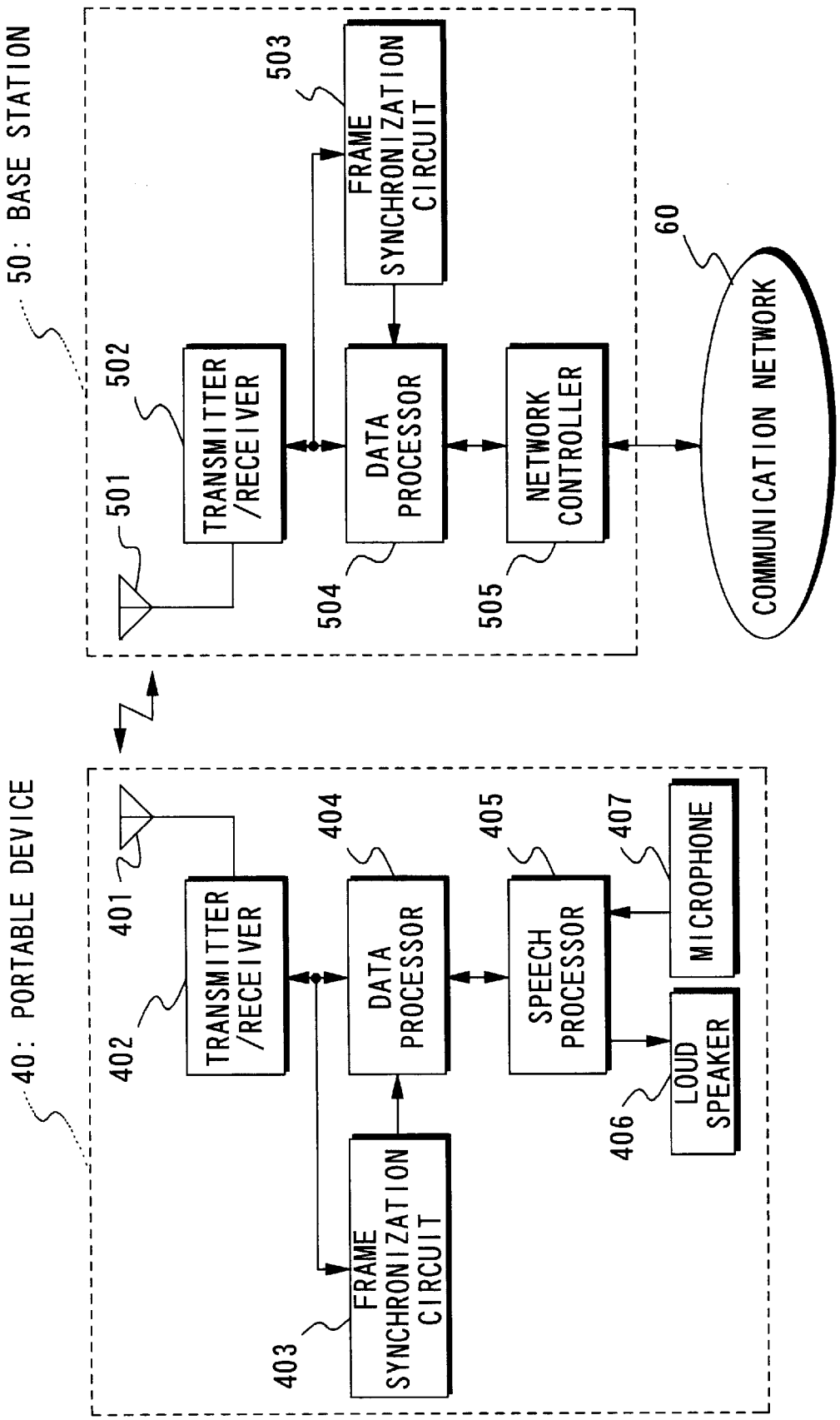
FIG. 10 is a block diagram of a mobile communications system employing the frame synchronization circuit of the present invention.
Figure 11:
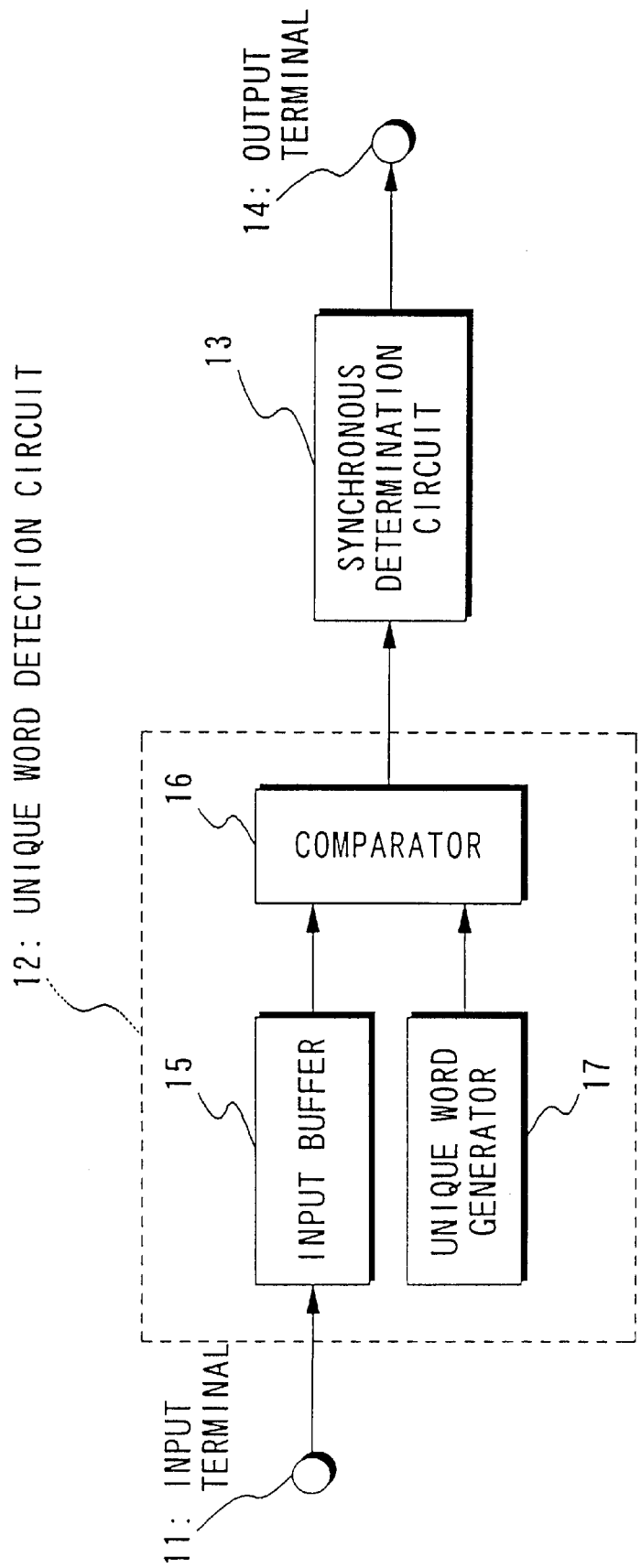
FIG. 11 is a block diagram of a conventional frame synchronization circuit.
Figure 12:
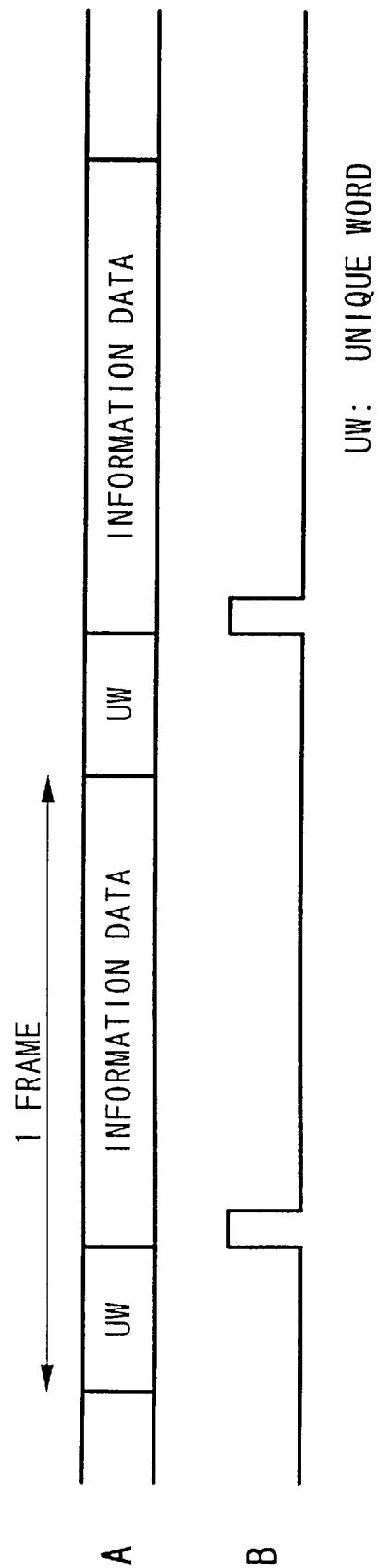
FIG. 12 is a timing chart for explaining the operation of a conventional frame synchronization circuit.
Figure 13:
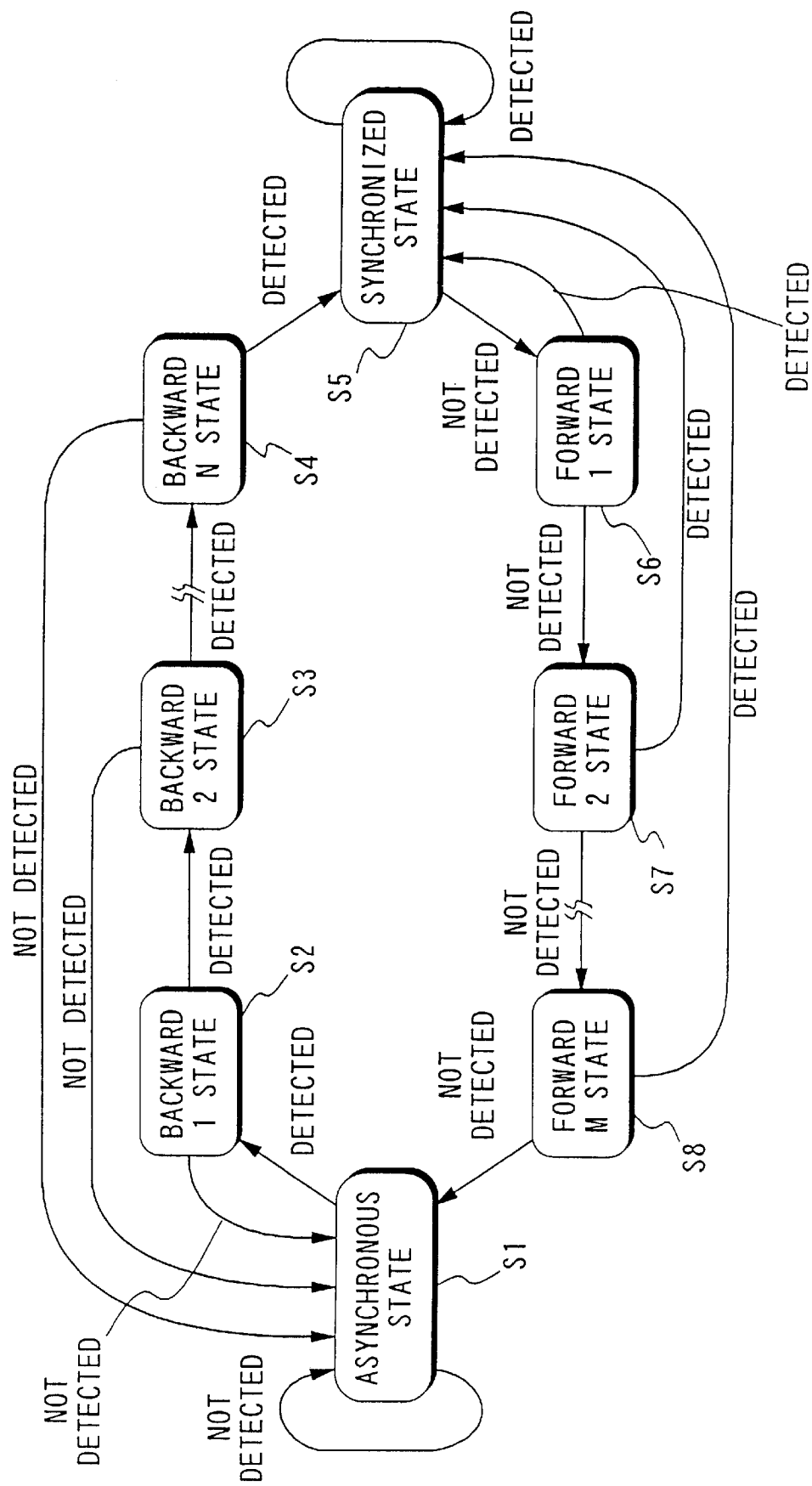
FIG. 13 is a state transition diagram for a conventional synchronous determination circuit.

This application relates to a mobile communications system employing the frame synchronization circuit explained in the first through fourth embodiments, and particularly, in the second embodiment. Here, FIG. 10 is a block diagram of a mobile communications system. This mobile communications system is composed of a mobile device 40 which is portable or which is installed in a car or the like, and a base station 50 which connects mobile device 40 with a communications network 60 and communicates with mobile device 40 using wireless communications. While only one mobile device 40 and base station 50 are shown in the figure, it is of course acceptable for there to be a plurality thereof.

Mobile device 40 is composed of antenna 401, transmitter and receiver 402, frame synchronization circuit 403, data processor 404, speech processor 405, loud speaker 406, microphone 407 and the like. Transmitter and receiver 402 modulates the signal supplied from data processor 404, transmits the modulated signal to base station 50 via antenna 401, demodulates the signal received at antenna 401, and supplies the signal to data processor 404.

Frame synchronization circuit 403 is a frame synchronization circuit according to the present invention. When frame synchronization circuit 403 identifies the frame position using the signal (frame construction signal) supplied from transmitter and receiver 402, and establishes synchronization, then a synchronous determination signal SD which indicates "1" is supplied to data processor 404. In the case where synchronization has not been established, then a synchronous determination signal SD which indicates "0" is supplied to data processor 404.

Data processor 404 extracts the user data (data, speech data), error correcting signal, error detection signal and the like from the signal (frame construction signal) supplied from transmitter and receiver 402, in accordance with synchronous determination signal SD. At the same time, a scramble or the like is added to the speech data from speech processor 405, after which control data is attached, the frame is constructed, and the data is supplied to transmitter and receiver 402.

Speech processor 405 converts speech data extracted by data processor 404 to an analog speech signal using a D/A convertor. The analog speech signal is then sounded via loud speaker 406. Next, speech processor 405 converts the analog speech signal input from microphone 407 to speech data via a A/D convertor, encodes the speech data using the specified method, and supplies the data to data processor 404.

Base station 50 is composed of an antenna 501, transmitter and receiver 502, frame synchronization circuit 503, data processor 504, network controller 505 and the like. Transmitter and receiver 502 modulates the signal received from data processor 504, and transmits it to mobile device 40 via antenna 501. The signal received by antenna 501 is then demodulated and supplied to data processor 504.

Frame synchronization circuit 503 is a frame synchronization circuit according to the present invention. When frame synchronization circuit 503 identifies the frame position using the signal (frame construction signal) supplied from transmitter and receiver 502, and establishes synchronization, then synchronous determination signal SD which indicates "1" is supplied to data processor 504. In the case where synchronization has not been established, then synchronous determinations signal SD which indicates "0" is supplied to data processor 504.

Data processor 504 extracts the user data (data, speech data), error correcting signal, error detection signal and the like from the signal (frame construction signal) supplied from transmitter and receiver 502, in accordance with synchronous determination signal SD. At the same time, a scramble or the like is added to the signal from network controller 505, after which control data is attached, the frame is constructed, and the data is supplied to transmitter and receiver 502.

Network controller 505 converts speech data extracted by data processor 504 to an analog speech signal using a D/A convertor. The analog speech signal is then sent to communications network 60. Next, network controller 505 converts the signal supplied from communications network 60 to a digital signal using a A/D convertor, encodes the signal using the specified method, and supplies it to data processor 504.

As a result of the above design, user data (data, speech data), error correcting signals, error detection signals and the like are extracted from received signals at the respective data processors 404, 504 of mobile device 40 and base station 50 based on synchronous determination signal SD supplied from frame synchronization circuit 403,503. Accordingly, the frame synchronization position can be correctly detected. Further, the time required to establish synchronization can be reduced, while the recovery time once out of synchronization has occurred can also be shortened.

An explanation was made above of each of the preferred embodiments of the present invention. However, the technical field of the present invention is not limited thereto, but rather the present invention may be executed with various modifications added to these embodiments. In this case, it should be clear that the invention realized in this manner is still within the technical scope of the claims.

What is claimed:

1. A frame synchronization circuit for detecting frame positions and synchronizing frames in a received data string which is encoded before transmission thereof in accordance with $M(2 \leq M)$ types of encoding rules, said frame synchronization circuit comprising:
   (a) $N(2 \leq N \leq M)$ blocks of likelihood calculating circuitry each assigned one of said encoding rules in view of which it evaluates said received data string in codewords to determine for each codeword a degree of confidence characterized by the assigned encoding rule;
   (b) N blocks of weighting circuitry each associated with one block of said likelihood calculating circuitry for weighting by a coefficient the degree of confidence of each codeword supplied from the associated block of said likelihood circuitry;
   (c) an adder for calculating a sum of the weighted degrees of confidence of each codeword supplied from said N blocks of weighting circuitry; and
   (d) a determination circuit for comparing the sum supplied from said adder with a threshold value to determine the frame positions.

2. A frame synchronization circuit according to claim 1, wherein said received data string has been encoded with a unique word indicating the frame positions, and
   one block of said likelihood calculating circuitry calculates a Hamming distance between said unique word and each codeword in said received data string.

3. A frame synchronization circuit according to claim 2, wherein said received data string has been encoded with a Golay (23, 12) error correcting code, and
   one block of said likelihood calculating circuitry decodes said Golay code and detects a number of bit errors in each codeword of said received data string.

4. A frame synchronization circuit according to claim 1, wherein said frame synchronization circuit further comprises a first control circuit that changes said weighting coefficients in response to the state of a transmission channel through which said data string has been received.

5. A frame synchronization circuit according to claim 1, wherein said frame synchronization circuit further comprises:
   a memory for storing a number of times the frame positions have successfully detected and a number of times the frame positions have failed to be detected; and
   a second control circuit for changing either the threshold value used by said determination circuit or said weighting coefficients used by said weighting circuitry on the basis of the numbers stored in said memory.

6. A frame synchronization circuit according to claim 1, wherein soft demodulation data is employed as said received data string.

7. A frame synchronization circuit for detecting frame positions and synchronizing frames in a received data string which is encoded before transmission thereof in accordance with $M(2 \leq M)$ types of encoding rules, said data string being encoded with a unique word indicating the frame positions, said frame synchronization circuit comprising:
   (a) a detection circuit for detecting said unique word in said received data string, said detection circuit calculating a Hamming distance between each codeword in said received data string and said unique word and comparing said Hamming distance with a predetermined value;
   (b) $N(2 \leq N \leq M)$ blocks of likelihood calculating circuitry each assigned one of said encoding rules in view of which it evaluates said received data string in codewords to determine for each codeword a degree of confidence characterized by the assigned encoding rule;
   (c) N blocks of weighting circuitry each associated with one block of said likelihood calculating circuitry for weighting by a coefficient the degree of confidence of each codeword supplied from the associated block of said likelihood circuitry;
   (d) an adder for calculating a sum of the weighted degrees of confidence of each codeword supplied from said N blocks of weighting circuitry; and
   (e) a determination circuit for comparing the sum supplied from said adder with a threshold value to determine the frame positions,
   wherein said likelihood calculating circuitry, said weighting circuitry, said adder, and said determination circuit perform their functions when said detection circuit detects said unique word.

8. A frame synchronization circuit according to claim 7, wherein said frame synchronization circuit further comprises a first control circuit for changing said weighting coefficients used by said weighting circuitry in response to the state of a transmission channel through which said data string has been received.

9. A frame synchronization circuit according to claim 7, wherein said frame synchronization circuit further comprises:
   a memory for storing a number of times the frame positions have been successfully detected and a number of times the frame positions have failed to be detected; and
   a second control circuit for changing either the threshold value used by said determination circuit or said weighting coefficients used by said weighting circuitry on the basis of the numbers stored in said memory.

10. A frame synchronization circuit according to claim 7, wherein soft demodulation data is employed as said received data string.

11. A frame synchronization circuit according to claim 7, wherein said received data string has been encoded with a Golay (23, 12) error correcting code, and
   one block of said likelihood calculating circuitry decodes said Golay code and detects a number of bit errors in each codeword of said received data string.

12. A communication system comprising a first radio station being connected to a communication channel network and a second radio station which communicates with said first radio station via radio waves, said first and second radio stations including:

(a) a frame synchronization circuit for detecting frame positions and synchronizing frames in a received data string which is encoded before transmission thereof in accordance with $M(2 \leq M)$ types of encoding rules, said frame synchronization circuit having
  (i) $N(2 \leq N \leq M)$ blocks of likelihood calculating circuitry each assigned one of said encoding rules in view of which it evaluates said received data string in codewords to determine for each codeword a degree of confidence characterized by the assigned encoding rule,
  (ii) N blocks of weighting circuitry each associated with one block of said likelihood calculating circuitry for weighting by a coefficient the degree of confidence of each codeword supplied from the associated block of said likelihood circuitry,
  (iii) an adder for calculating a sum of the weighted degrees of confidence of each codeword supplied from said N blocks of weighting circuitry, and
  (iv) a first determination circuit for comparing the sum supplied from said adder with a threshold value to determine the frame positions; and
(b) a data processing circuit for extracting data from the frames determined by said determination circuit.

13. A communication system according to claim 12, wherein said first radio station is a base station in a mobile communication network, and said second radio station is a mobile station in the mobile communication network.

* * * * *